(12) United States Patent
Park et al.

(10) Patent No.: US 11,537,517 B2
(45) Date of Patent: Dec. 27, 2022

(54) MEMORY DEVICE FOR SUPPORTING CACHE READ OPERATION, OPERATING METHOD THEREOF, AND MEMORY SYSTEM INCLUDING THE SAME

(71) Applicant: SK hynix Inc., Gyeonggi-do (KR)

(72) Inventors: Gwan Park, Gyeonggi-do (KR); Jeong Gil Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/492,851

(22) Filed: Oct. 4, 2021

(65) Prior Publication Data
US 2022/0342817 A1    Oct. 27, 2022

(30) Foreign Application Priority Data
Apr. 23, 2021   (KR) .......... 10-2021-0053229

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802

USPC ......................................................... 711/118
See application file for complete search history.

(56) References Cited

U.S. PATENT DOCUMENTS 9,496,046 B1   11/2016  Jin
2003/0191897 A1*  10/2003  Kao ..................... G06F 9/3802
                                                            712/E9.055

FOREIGN PATENT DOCUMENTS

KR          100862119 B1    10/2008

* cited by examiner

*Primary Examiner* — Jae U Yu
(74) *Attorney, Agent, or Firm* — IP & T Group LLP

(57) ABSTRACT

A memory device comprises: a page buffer including a first and second latch, a control circuit configured to perform reading data of a word line and storing the data in the first latch, perform discharging the word line, perform moving the data of the first latch to the second latch, and perform outputting the data of the second latch to an exterior, and a control logic configured to control the control circuit such that an execution section of the discharge and moving for a first word line at least partially overlap each other when a second or third cache read command is inputted in a section in which the storage or discharge for the first word line is performed in response to a first cache read command for the first word line.

20 Claims, 8 Drawing Sheets

MEMORY DEVICE FOR SUPPORTING CACHE READ OPERATION, OPERATING METHOD THEREOF, AND MEMORY SYSTEM INCLUDING THE SAME

CROSS-REFERENCE TO RELATED APPLICATION

This application claims priority under 35 U.S.C. § 119 to Korean Patent Application No. 10-2021-0053229 filed on Apr. 23, 2021, which is incorporated herein by reference in its entirety.

BACKGROUND

1. Field

Embodiments of the present disclosure relate to a semiconductor design technology, and specifically, to a memory device for supporting a cache read operation, an operating method of the memory device, and a memory system including the memory device.

2. Discussion of the Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when the power supply is interrupted. Representative examples of the volatile memory device include a static RAM (SRAM), a dynamic RAM (DRAM), a synchronous DRAM (SDRAM), etc. The nonvolatile memory device is a memory device in which data stored therein is retained even when the power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories are chiefly classified into a NOR-type memory and NAND-type memory.

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device implemented as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments of the present disclosure are directed to a memory device capable of effectively performing a cache read operation, an operating method of the memory device, and a memory system including the memory device.

Technical problems to be achieved in the present disclosure are not limited to the aforementioned technical problems and other unmentioned technical problems will be clearly understood by those skilled in the art in the technical field to which the present disclosure pertains, from the following description.

In accordance with an embodiment of the present invention, a memory device may include: a memory cell array including a plurality of memory cells coupled between a plurality of word lines and a plurality of bit lines; a plurality of page buffers coupled to the plurality of bit lines, each page buffer including a first latch and a second latch; a control circuit configured to perform a storage operation of reading data of a page coupled to a word line selected from the plurality of word lines and storing the read data in the first latch, a discharge operation of discharging the selected word line after the storage operation, a moving operation of moving the data of the first latch to the second latch after the storage operation, and an output operation of outputting the data of the second latch to an exterior after the moving operation; and a control logic configured to control the control circuit such that an execution section of the discharge operation and an execution section of the moving operation for a first word line among the plurality of word lines at least partially overlap each other when a second or third cache read command is inputted in a section in which the storage operation or the discharge operation for the first word line is performed in response to input of a first cache read command for cache-reading data of a page coupled to the first word line.

The second cache read command may be a command for cache-reading data of a page coupled to a second word line among the plurality of word lines, and the third cache read command may be a command for ending a cache read operation for the first word line after the cache read operation for the first word line is performed.

When the second or third cache read command is inputted in the section in which the storage operation for the first word line is performed, the control logic may control the control circuit to start the moving operation together at a start time of the discharge operation for the first word line.

When the second or third cache read command is inputted in the section in which the discharge operation for the first word line is performed, the control logic may control the control circuit to start the moving operation at a time when it is determined that the second or third cache read command has been inputted.

When the second cache read command is inputted in the section in which the storage operation or the discharge operation for the first word line is performed, the control logic may control the control circuit to start a preparation operation for preparing the storage operation for the second word line at a time when the discharge operation and the storage operation for the first word line are performed, and may control the control circuit to perform the storage operation and the output operation for the second word line together at a time when the preparation operation is performed.

The control logic may control the control circuit to perform, as the preparation operation, an operation of selecting the second word line by decoding an address inputted together with the second cache read command and an operation of resetting the first latch.

When the third cache read command is inputted in the section in which the storage operation or the discharge operation for the first word line is performed, the control logic may control the control circuit to perform the output operation at a time when the discharge operation for the first word line and the moving operation for the first word line are performed.

In accordance with an embodiment of the present invention, a memory system may include: a memory device including a memory cell array including a plurality of memory cells coupled between a plurality of word lines and a plurality of bit lines and a plurality of page buffers coupled to the plurality of bit lines, each page buffer including a first latch and a second latch; and a controller configured to generate a first cache read command for cache-reading data of a page coupled to a first word line among the plurality of word lines, to transfer the first cache read command to the memory device, to generate a second or third cache read command, and to transfer the second or third cache read command to the memory device. When the second or third cache read command is inputted in a section in which a first storage operation of reading data of the page coupled to the first word line in response to the first cache read command and storing the read data in the first latch or a discharge operation of discharging the first word line after the first storage operation is performed, the memory device may perform the discharge operation and a moving operation of moving the data of the first latch to the second latch in an at least a partially overlapping manner.

The controller may generate the second cache read command and transfers the second cache read command to the memory device in order to cache-read data of a page coupled to a second word line among the plurality of word lines, and after a cache read operation for the first word line is performed, the controller may generate the third cache read command and may transfer the third cache read command to the memory device in order to end the cache read operation for the first word line.

When the second or third cache read command is inputted in a section in which the first storage operation is performed, the memory device may start the moving operation together at a start time of the discharge operation.

When the second or third cache read command is inputted in a section in which the discharge operation is performed, the memory device may start the moving operation at a time when it is determined that the second or third cache read command has been inputted.

When the second cache read command is inputted in a section in which the first storage operation or the discharge operation is performed, the memory device may start a preparation operation for preparing a second storage operation of reading the data of a page coupled to the second word line and storing the read data in the first latch at a time when the discharge operation and the moving operation are performed, and may perform the second storage operation and an output operation of outputting data of the second latch to the controller at a time when the preparation operation is performed.

The memory device may perform, as the preparation operation, an operation of selecting the second word line by decoding an address inputted together with the second cache read command and an operation of resetting the first latch.

When the third cache read command is inputted in the section in which the first storage operation or the discharge operation is performed, the memory device may perform the output operation at a time when the discharge operation and the moving operation are performed.

In accordance with an embodiment of the present invention, an operating method of a memory device including a memory cell array including a plurality of memory cells coupled between a plurality of word lines and a plurality of bit lines and a plurality of page buffers coupled to the plurality of bit lines, each page buffer including a first latch and a second latch, the operating method may include: a first storage operation of storing data of a page coupled to a first word line among the plurality of word lines in the first latch in response to input of a first cache read command; a discharge operation of discharging the first word line after the first storage operation; a moving operation of moving the data of the first latch to the second latch after the first storage operation; and a parallel execution operation of performing an execution section of the discharge operation and an execution section of the moving operation in such a way that the execution sections partially overlap each other when a second or third cache read command is inputted in a section in which the first storage operation or the discharge operation is performed.

The second cache read command may be a command for cache-reading data of a page coupled to a second word line among the plurality of word lines, and the third cache read command may be a command for ending a cache read operation for the first word line after the cache read operation for the first word line is performed.

The parallel execution operation may include: starting the moving operation together at a start time of the discharge operation when the second or third cache read command is inputted in the section in which the first storage operation is performed; and when the second or third cache read command is inputted in the section in which the discharge operation is performed, starting the moving operation at a time when it is determined that the second or third cache read command has been inputted.

The operating method may further include: storing the data of the page coupled to the second word line in the first latch in response to input of the second cache read command; outputting data of the second latch to an exterior after the moving operation; and when the second cache read command is inputted in the parallel execution operation, starting a preparation operation for preparing the second storage operation at a time when the parallel execution operation is performed and performing the second storage operation and the output operation together at a time when the preparation operation is performed.

The preparation operation may include an operation of selecting the second word line by decoding an address inputted together with the second cache read command and an operation of resetting the first latch.

The operating method may further include: when the third cache read command is inputted in the parallel execution operation, performing the output operation at a time when the parallel execution operation is performed.

In accordance with an embodiment of the present invention, a memory system may include: a memory device including a plurality of pages, each page including multiple cells coupled to a word line among a plurality of word lines and a plurality of page buffers coupled to a plurality of bit lines, each page buffer including a first latch and a second latch; and a controller configured to generate a first cache read command and a second cache read command sequentially. The memory device may be configured to: read data of a first page among the plurality of pages in response to the first cache read command; store the data of the first page in the first latch; determine whether the second cache read command is received when reading the data of the first page and storing the data of the first page; and when it is determined that the second cache read command is received when reading the data of the first page and storing the data of the first page, parallelly perform discharging a first word line associated with the first page and moving the data of the first page stored in the first latch to the second latch.

The memory device may be further configured to: output, to the controller, the data of the first page in the second latch.

In accordance with the present technology, in a memory device for supporting a cache read operation, it is possible to perform in parallel an operation of discharging a word line and an operation of moving data of a sensing latch to a cache latch, the operations being required to be performed between two consecutive cache read operations.

Consequently, it is possible to minimize the time required for the cache read operation.

DETAILED DESCRIPTION

Figure 1:
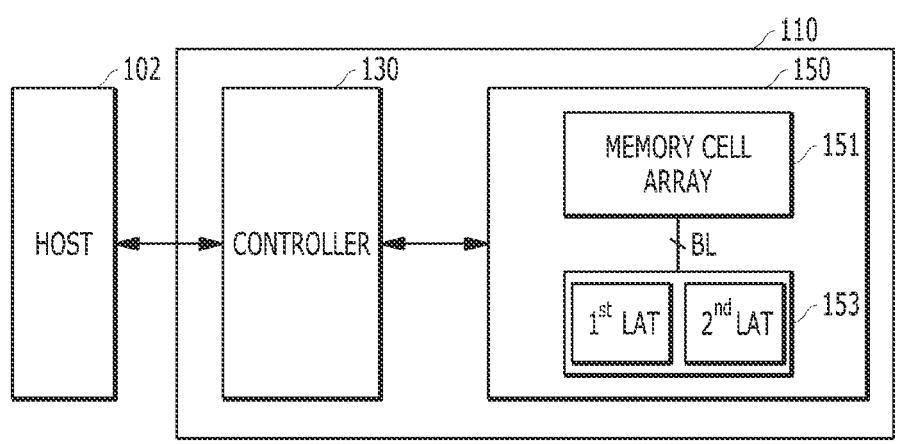
FIG. 1 is a diagram illustrating an example of a memory system in accordance with an embodiment of the present disclosure.

Various examples of the present disclosure are described below in more detail with reference to the accompanying drawings.

Aspects and features of the present invention, however, may be embodied in different ways to form other embodiments, including variations of any of the disclosed embodiments. Thus, the invention is not limited to the embodiments set forth herein. Rather, the described embodiments are provided so that this disclosure is thorough and complete, and fully conveys the disclosure to those skilled in the art to which the invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may be exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to limit the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention pertains in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted that in some instances, as would be apparent to those skilled in the relevant art, a feature or element described in connection with one embodiment may be used singly or in combination with other features or elements of another embodiment, unless otherwise specifically indicated.

Embodiments of the present disclosure are described in detail below with reference to the accompanying drawings, wherein like numbers reference like elements.

FIG. 1 is a diagram illustrating an example of a memory system in accordance with an embodiment of the present disclosure.

Referring to FIG. 1, the data processing system may include a host 102 engaged or operably coupled with the memory system 110.

The host 102 may include any of a portable electronic device, such as a mobile phone, an MP3 player, a laptop computer, or the like, and an electronic device, such as a desktop computer, a game player, a television (TV), a projector, or the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control an operation of storing data in the memory device 150.

The controller 130 and the memory device 150 may be integrated into a single semiconductor device, which may be included in any of the various types of memory systems as discussed above in the examples.

By way of example but not limitation, the controller 130 and the memory device 150 may be implemented with an SSD. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (e.g., SM, SMC), a memory stick, a multimedia card (e.g., MMC, RS-MMC, MMCmicro), a secure digital (SD) card (e.g., SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided by the host 102 through a write operation and provide data stored therein to the host 102 through a read operation.

In the present specification, by way of example, the memory device 150 is a NAND flash memory. In accordance with an embodiment, the memory device 150 may be implemented in a three-dimensional array structure.

The present disclosure may also be applied to a flash memory device in which a charge storage layer is composed of a conductive floating gate (FG), as well as a charge trap flash (CTF) in which a charge storage layer is composed of an insulating film.

Specifically, the memory device 150 may include a memory cell array 151 and a plurality of page buffers 153. The memory cell array 151 may include a plurality of memory cells (not illustrated) connected between a plurality of word lines (not illustrated) and a plurality of bit lines BL. The plurality of page buffers 153 may be connected to the memory cell array 151 through the plurality of bit lines BL. That is, each of the plurality of page buffers 153 may be connected to at least one bit line BL to temporarily store at least one bit of data to be read/written from/to at least one memory cell.

The memory device 150 is configured to receive a command and an address from the controller 130, and to access an area of the memory cell array 151 selected by the address. That is, the memory device 150 may perform an operation corresponding to the command on the area selected by the address. For example, the memory device 150 may perform a write operation (program operation), a read operation, and an erase operation. During the program operation, the memory device 150 programs data in the area selected by the address. During the read operation, the memory device 150 reads data from the area selected by the address. During the erase operation, the memory device 150 erases the data stored in the area selected by the address.

In accordance with an embodiment, the read operation performed by the memory device 150 may be classified into a normal read operation and a cache read operation.

During the normal read operation, the memory device 150 may receive a normal read command and an address from the controller 130. The memory device 150 may read the data stored in the area selected by the address, and store the read data in one of the page buffers 153. Then, the read data stored in one of the page buffers 153 may be outputted in response to a data out command inputted from the controller 130.

During the cache read operation, the memory device 150 may receive a cache read command and an address from the controller 130. The address provided to the memory device 150 during the cache read operation may be an address corresponding to the plurality of word lines (a plurality of pages). Alternatively, the address provided to the memory device 150 during the cache read operation may be an address that consecutively varies according to a method set in response to each of a plurality of cache read commands that are consecutively received. In response to the cache read command, the memory device 150 may consecutively read data, which is requested according to the cache read command and corresponds to the plurality of word lines (the plurality of pages), in units of pages.

The cache read operation may be an operation of reading data of one page among the plurality of pages included in the memory cell array 151, storing the read page data in the plurality of page buffers 153, reading data of another page of the memory cell array 151 while the one page data stored in the plurality of page buffers 153 is being outputted to the controller 130, and storing the read data of another page in the plurality of page buffers 153.

At this time, at least one page may be coupled to one of the plurality of word lines included in the memory cell array 151. For example, when each of the plurality of memory cells coupled to one word line is a single level cell (SLC) capable of storing 1-bit data, one page may be coupled to one word line. Furthermore, when each of the plurality of memory cells coupled to one word line is a multi-level cell (MLC) capable of storing 2-bit data, two pages may be coupled to one word line. Furthermore, when each of the plurality of memory cells coupled to one word line is a triple level cell (TLC) capable of storing 3-bit data, three pages may be coupled to one word line.

Since at least one page may be coupled to one word line as described above, the cache read operation may be an operation of reading data of a first page between the first page and a second page coupled to one word line selected from the plurality of word lines included in the memory cell array 151, storing the read data of the first page in the plurality of page buffers 153, reading data of the second page while the stored data of the first page is being outputted to the controller 130, and storing the read data of the second page in the plurality of page buffers 153, in accordance with an embodiment. For reference, in the following description, one page is coupled to one word line; however, this is only one embodiment and a plurality of pages may also be coupled to one word line according to a designer's choice.

In some embodiments, each of the plurality of page buffers 153 may include a first latch $1^{st}$ LAT and a second latch $2^{nd}$ LAT. In the drawing, it can be seen that one page buffer among the plurality of page buffers 153 is illustrated only and thus only one $1^{st}$ LAT and one $2^{nd}$ LAT are illustrated. However, this is only for convenience of description, and actually, each of the plurality of page buffers 153 may be connected to at least one bit line BL and the number of page buffers may vary depending on the number of bit lines. Furthermore, in the drawing, two latches (the $1^{st}$ LAT and the $2^{nd}$ LAT) are included in each of the plurality of page buffers 153; however, this is only for convenience of description and a larger number of latches may also be included according to the designer's choice.

In accordance with an embodiment, the cache read operation may be an operation of reading page data stored in a first word line among the plurality of word lines included in the memory cell array 151, storing the read data in the $1^{st}$ LAT included in each of the plurality of page buffers 153, moving the page data stored in the $1^{st}$ LAT to the $2^{nd}$ LAT, reading page data stored in a second word line among the plurality of word lines included in the memory cell array 151, while the data of the $2^{nd}$ LAT is being outputted to the controller 130, and storing the read data in the $1^{st}$ LAT.

More specifically, the controller 130 may generate a first cache read command, transfer the first cache read command to the memory device 150, generate a second cache read command or a third cache read command, and then transfer the second cache read command or the third cache read command to the memory device 150. That is, the controller 130 may sequentially generate the first cache read command and the second cache read command and transfer the first cache read command and the second cache read command to the memory device 150, or may sequentially generate the first cache read command and the third cache read command and transfer the first cache read command and the third cache read command to the memory device 150. In such a case, the first cache read command may be a command for cache-reading the data of a page coupled to the first word line (hereinafter referred to as the data of the first word line) among the plurality of word lines included in the memory device 150. Furthermore, the second cache read command may be a command for cache-reading the data of a page coupled to the second word line (hereinafter referred to as the data of the second word line) among the plurality of word lines included in the memory device 150. That is, when the controller 130 sequentially generates the first cache read command and the second cache read command and transfers the first cache read command and the second cache read command to the memory device 150, the data of the first word line and the data of the second word line among the plurality of word lines included in the memory device 150 may be consecutively outputted through the cache read operation. Furthermore, the third cache read command may be a command for completing the cache read operation for the first word line and then ending the cache read operation. That is, when the controller 130 sequentially generates the first cache read command and the third cache read command and transfers the first cache read command and the third cache read command to the memory device 150, the data of the first word line among the plurality of word lines included in the memory device 150 may be outputted through the cache read operation, and then the cache read operation may be ended.

In an embodiment, while the controller 130 generates the first cache read command and transfers the first cache read command to the memory device 150, the cache read operation may be started. Furthermore, the relationship between the first cache read command and the second or third cache read command may mean two consecutive cache read commands. For example, cache read commands which are generated for the first time, for the second time, and for the third time by the controller 130, are consecutively transferred to the memory device 150. In such a case, from the viewpoint of the cache read command generated for the second time, the cache read command generated for the first time may be the first cache read command and the cache read command generated for the second time may be the second cache read command. From the viewpoint of the cache read command generated for the third time, the cache read command generated for the second time may be the first cache read command and the cache read command generated for the third time may be the second or third cache read command. When the cache read command generated for the third time is the second cache read command, there may exist a cache read command generated for the fourth time subsequent to the cache read command generated for the third time. On the other hand, when the cache read command generated for the third time is the third cache read command, the cache read operation may be ended after the cache read command generated for the third time. After the cache read operation is ended, when the controller 130 generates the normal read command and transfers the normal read command to the memory device 150, the memory device 150 may perform the normal read operation. Furthermore, after the cache read operation is ended, when the controller 130 generates the first cache read command and transfers the first cache read command to the memory device 150, the memory device 150 may perform the cache read operation again.

Then, the memory device 150 may perform a 'first storage operation' of reading the page data of the first word line in response to the first cache read command transferred from the controller 130 and storing the read page data in the $1^{st}$ LAT included in each of the plurality of page buffers 153. Furthermore, the memory device 150 may perform a 'discharge operation' of discharging the first word line after the 'first storage operation'. Furthermore, the memory device 150 may perform a 'moving operation' of moving the page data of the $1^{st}$ LAT to the $2^{nd}$ d LAT after the 'first storage operation'. Furthermore, the memory device 150 may perform an 'output operation' of outputting the page data of the $2^{nd}$ LAT to the controller 130 after the 'moving operation'. Furthermore, when the second cache read command subsequent to the first cache read command is transferred by the controller 130, after completing the 'discharge operation' and the 'moving operation', the memory device 150 may perform a 'second storage operation' of reading the data of the second word line in response to the second cache read command transferred from the controller 130 and storing the read data in the $2^{nd}$ d LAT included in each of the plurality of page buffers 153. Furthermore, when the third cache read command subsequent to the first cache read command is transferred by the controller 130, the memory device 150 may end the cache read operation after completing the 'output operation'. For reference, performing the 'discharge operation' of discharging the first word line may mean that the potential levels of the first word line and a bit line connected to the first word line are initialized to set levels.

In a case where the memory device 150 performs the cache read operation, when a 'moving operation' corresponding to a cache read command inputted for the second time is performed in a state in which an 'output operation' corresponding to a cache read command inputted for the first time is not completely performed, data corresponding to the first inputted cache read command and data corresponding to the cache read command inputted for the second time may be mixed. For example, while the data corresponding to the cache read command inputted for the first time is being outputted from the $2^{nd}$ d LAT of the page buffer 153, when the data corresponding to the cache read command inputted for the second time moves from the $1^{st}$ LAT to the $2^{nd}$ d LAT, the data corresponding to the cache read command inputted for the first time and the data corresponding to the cache read command inputted for the second time may be mixed in the $2^{nd}$ d LAT.

Accordingly, the memory device 150 may perform the 'moving operation' corresponding to the cache read command inputted for the second time after confirming that the 'output operation' corresponding to the cache read command inputted for the first time has been completely performed. That is, the memory device 150 may confirm whether there is a cache read command that is inputted for the third time that is inputted later than the cache read command inputted for the second time, thereby confirming that the 'output operation' corresponding to the cache read command inputted for the first time has been completely performed. This is because the presence of the cache read command inputted for the third time means that the 'output operation' of the cache read command inputted for the first time has been completely performed. Accordingly, when there is the cache read command inputted for the third time, the memory device 150 may perform the 'moving operation' corresponding to the cache read command inputted for the second time.

Specifically, when the second cache read command or the third cache read command is inputted from the controller 130 in a section in which the 'first storage operation' or the 'discharge operation' is performed, the memory device 150 may perform the 'discharge operation' and the 'moving operation' in an at least a partially overlapping manner.

More specifically, when the second cache read command or the third cache read command is inputted from the controller 130 in the section in which the 'first storage operation' is performed, the memory device 150 may start the 'moving operation' together at the start time of the 'discharge operation'. That is, when the second cache read command or the third cache read command is inputted from the controller 130 in the section in which the 'first storage operation' is performed, the memory device 150 may perform the 'discharge operation' and the 'moving operation' in such a way that the execution sections of the 'discharge operation' and the 'moving operation' completely overlap each other.

Furthermore, when the second cache read command or the third cache read command is inputted from the controller 130 in the section in which the 'discharge operation' is performed, the memory device 150 may start the 'moving operation' at the time when it is confirmed that the second cache read command or the third cache read command has been inputted from the controller 130. That is, when the second cache read command or the third cache read command is inputted from the controller 130 in the section in which the 'discharge operation' is performed, the memory device 150 may perform the 'discharge operation' and the 'moving operation' in such a way that the execution sections of the 'discharge operation' and the 'moving operation' partially overlap each other.

Furthermore, when the second cache read command is inputted from the controller 130 in the section in which the 'first storage operation' or the 'discharge operation' is performed, the memory device 150 may start a 'preparation operation' for preparing the 'second storage operation' at the time when the 'discharge operation' and the 'moving operation' are completely performed.

Furthermore, the memory device 150 may perform the 'second storage operation' and the 'output operation' together at the time when the 'preparation operation' is completely performed. That is, by starting the 'second storage operation' and the 'output operation' together at the time when the 'preparation operation' is completely performed, the memory device 150 may perform the 'second storage operation' and the 'output operation' in such a way that the execution sections of the 'second storage operation' and the 'output operation' completely overlap each other. In such a case, the memory device 150 may perform, as the 'preparation operation', an operation of decoding an address inputted together with the second cache read command from the controller 130 and selecting the second word line and an operation of resetting the $1^{st}$ LAT.

Furthermore, when the third cache read command is inputted from the controller 130 in the section in which the 'first storage operation' or the 'discharge operation' is performed, the memory device 150 may perform the 'output operation' at the time when the 'discharge operation' and the 'moving operation' are completely performed.

Figure 2:
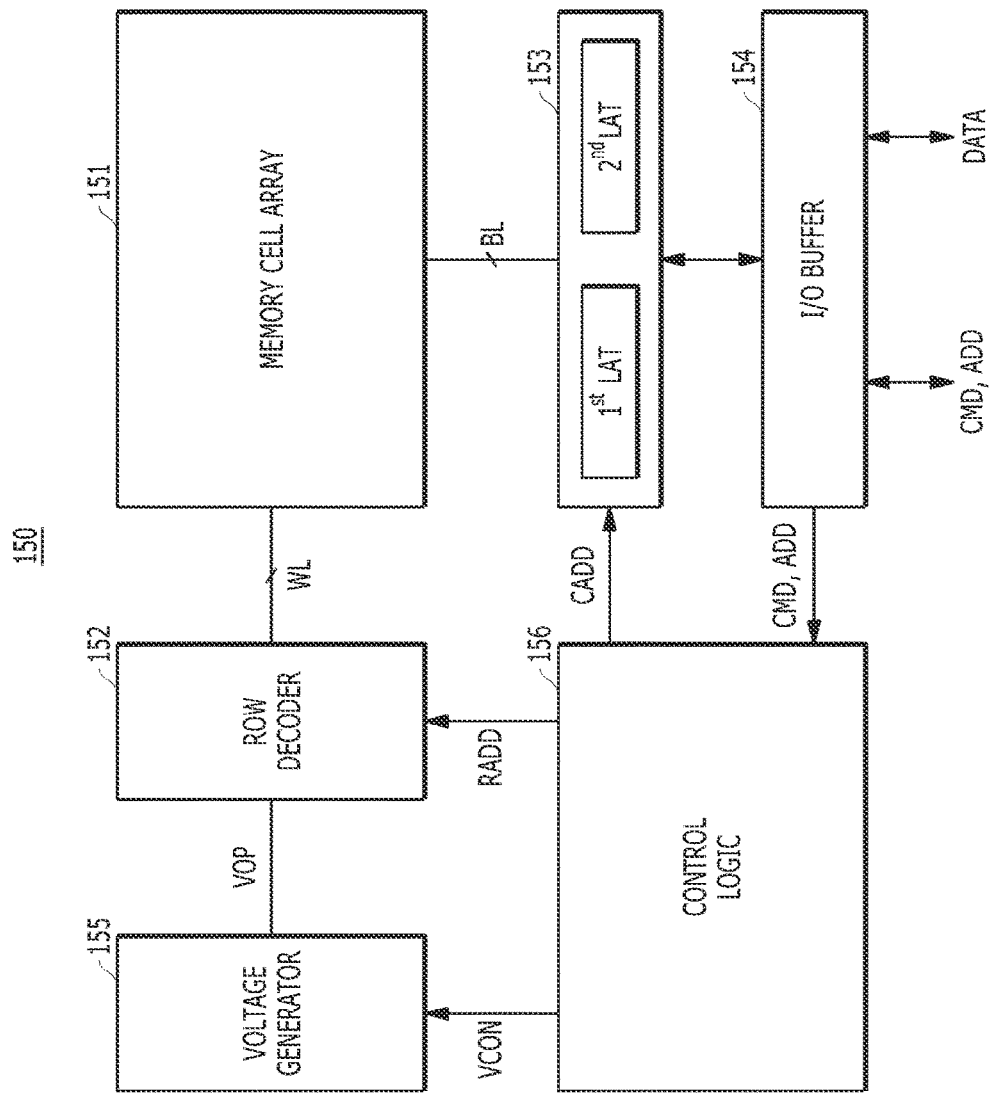
FIG. 2 is a diagram illustrating an example of a memory device in accordance with an embodiment of the present disclosure.

FIG. 2 is a diagram illustrating an example of the memory device illustrated in FIG. 1 in accordance with an embodiment of the present disclosure.

Figure 3:
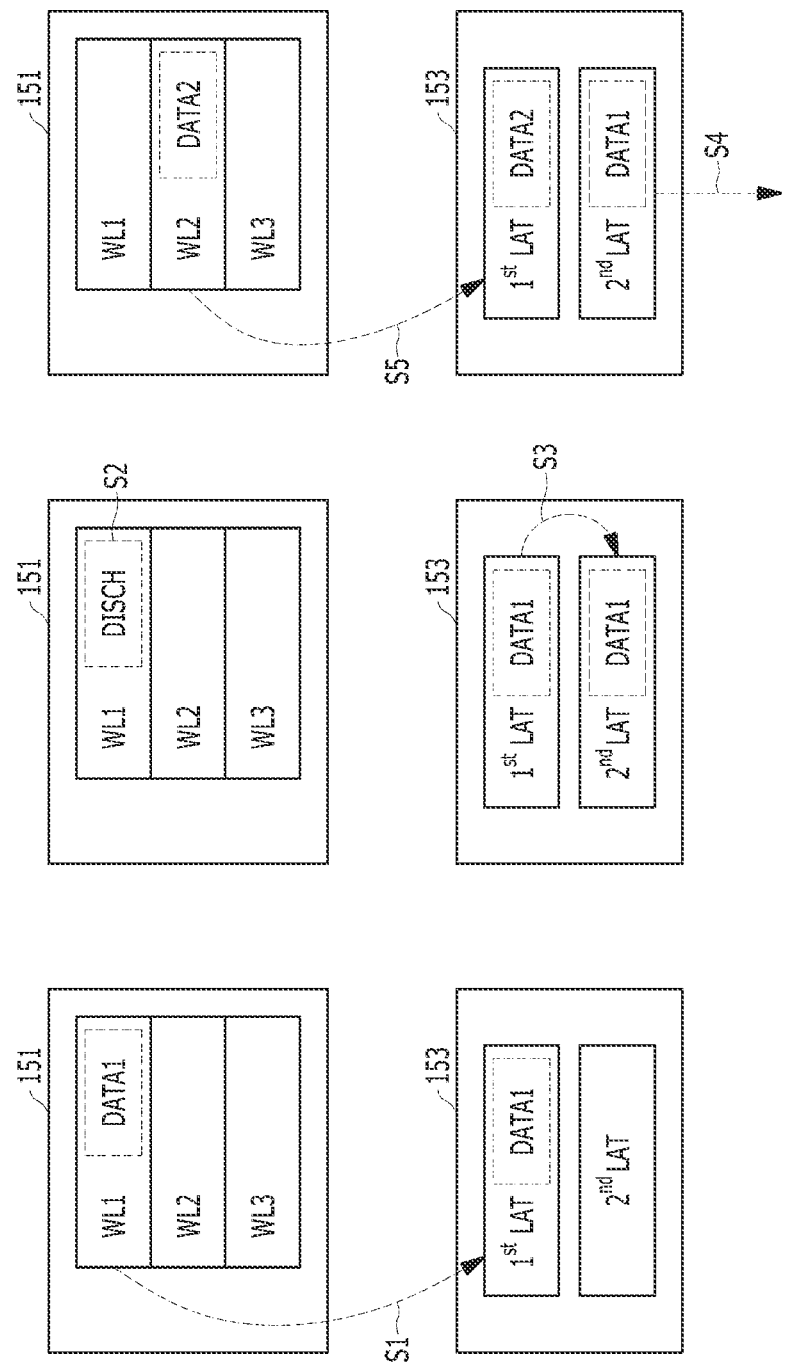
FIG. 3 is a diagram illustrating an example of a cache read operation in accordance with an embodiment of the present disclosure.

FIG. 3 is a diagram illustrating an example of a cache read operation in accordance with an embodiment of the present disclosure.

FIG. 4 to FIG. 7 are diagrams illustrating a cache read operation in accordance with an embodiment of the present disclosure, e.g., the cache read operation described in FIG. 3.

First, referring to FIG. 2, the memory device 150 may include the memory cell array 151, the plurality of page buffers 153, control circuits 152, 154, and 155, and a control logic 156.

The memory cell array 151 may include the plurality of memory cells (not illustrated) connected between the plurality of word lines WL and the plurality of bit lines BL. Furthermore, the plurality of page buffers 153 may be connected to the plurality of bit lines BL. Furthermore, the control circuits 152, 154, and 155 may perform a program operation for transferring data to the memory cell array 151 through the plurality of page buffers 153 and storing the data, a read operation for receiving the data stored in the memory cell array 151 through the plurality of page buffers 153 and outputting the received data to an exterior, for example, the controller 130 (FIG. 1), and an erase operation for erasing the data stored in the memory cell array 151. Furthermore, the control logic 156 may control the control circuits 152, 154, and 155 and the plurality of page buffers 153 under the control of the controller 130 (FIG. 1).

More specifically, the control circuits 152, 154, and 155 may include a row decoder 152, an input/output (I/O) buffer 154, and a voltage generator 155.

The voltage generator 155 may be connected to the row decoder 152 and the control logic 156. The voltage generator 155 may be configured to generate various voltages required for program, read, and erase operations in response to a voltage control signal VCON of the control logic 156. The voltages generated by the voltage generator 155 may be transferred to the word line WL connected to the memory cell array 151 through the row decoder 152.

In accordance with an embodiment, the voltage generator 155 may generate an internal power supply voltage by regulating an external power supply voltage. The internal power supply voltage generated by the voltage generator 155 may be used as an operating voltage of the memory device 150. In accordance with an embodiment, the voltage generator 155 may generate a plurality of voltages by using the external power supply voltage or the internal power supply voltage. For example, the voltage generator 155 may include a plurality of pumping capacitors that receive the internal power supply voltage, and may generate a plurality of voltages by selectively activating the plurality of pumping capacitors in response to the control of the control logic 156.

The control logic 156 may be connected to the row decoder 152, the page buffer 153, the I/O buffer 154, and the voltage generator 155. The control logic 156 may output the voltage control signal VCON for generating voltages required for the operation of the memory device 150 in response to a command CMD inputted through the I/O buffer 154. The control logic 156 may output a row address signal RADD and a column address signal CADD in response to an address signal ADD inputted through the I/O buffer 154.

Furthermore, the row decoder 152 may be electrically connected to the memory cell array 151 through the word line WL. The row decoder 152 may be configured to operate in response to the control of the control logic 156. The row decoder 152 may receive the row address signal RADD from the control logic 156. The row decoder 152 may be configured to decode the received row address signal RADD. The row decoder 152 may select any of the plurality of word lines included in the memory cell array 151 in response to the decoded row address signal RADD. The row decoder 152 may transfer various operating voltages VOP generated by the voltage generator 155, for example, the voltages used for program, read, and erase operations, to the plurality of word lines included in the memory cell array 151.

The plurality of page buffers 153 may operate as write drivers or sense amplifiers according to an operation mode. During the program operation, the plurality of page buffers 153 may transfer voltages, corresponding to data to be programmed, to the bit lines BL of the memory cell array 151. During the read operation, the plurality of page buffers 153 may sense data, stored in a selected memory cell, through the bit lines BL and transfer the sensed data to the I/O buffer 154. During the erase operation, the plurality of page buffers 153 may float the bit lines BL of the memory cell array 151.

During the program operation, the I/O buffer 154 may transfer write data, inputted from an exterior (e.g., the controller 130 of FIG. 1), to the plurality of page buffers 153. During the read operation, the I/O buffer 154 may output data, provided from the plurality of page buffers 153, to an exterior. The I/O buffer 154 may transfer the address ADD or the command CMD inputted from an exterior to the control logic 156.

Referring to FIG. 1 to FIG. 3 together, each of the plurality of page buffers 153 of the memory device 150 may include the $1^{st}$ LAT to the $2^{nd}$ LAT.

The control circuits 152, 154, and 155 included in the memory device 150 may perform a storage operation S1 or S5 of reading data of a word line WL1 or WL2 selected from the plurality of word lines WL included in the memory cell array 151 and storing the read data in the $1^{st}$ LAT included in each of the plurality of page buffers 153. Furthermore, the control circuits 152, 154, and 155 may perform a discharge operation S2 of discharging the selected word line WL1 or WL2 after the storage operation S1 or S5. Furthermore, the control circuits 152, 154, and 155 may perform a moving operation S3 of moving the data of the $1^{st}$ LAT to the $2^{nd}$ d LAT after the storage operation S1 or S5. Furthermore, the control circuits 152, 154, and 155 may perform an output operation S4 of outputting the data of the $2^{nd}$ LAT to an exterior, for example, the controller 130, after the moving operation S3.

Referring to FIG. 1 to FIG. 7, the control logic 156 included in the memory device 150 may control the control circuits 152, 154, and 155 to perform a first storage operation S1 of, in response to an external input of a first cache read command L1 for cache-reading data DATA1 of a first word line WL1 among the plurality of word lines WL included in the memory cell array 151, reading the data DATA1 stored in the first word line WL1, and storing the read data DATA1 in the $1^{st}$ LAT included in each of the plurality of page buffers 153. Furthermore, the control logic 156 may control the control circuits 152, 154, and 155 to perform the discharge operation S2 of discharging the first word line WL1 after the first storage operation S1. Furthermore, the control logic 156 may control the control circuits 152, 154, and 155 to perform the moving operation S3 of moving the data DATA1 of the first word line WL1 stored in the $1^{st}$ LAT to the $2^{nd}$ LAT after the first storage operation S1. Furthermore, the control logic 156 may control the control circuits 152, 154, and 155 to perform a second storage operation S5 of, in response to an external input of a second cache read command L2 (see FIG. 4) for cache-reading data DATA2 of a second word line WL2 among the plurality of word lines WL included in the memory cell array 151, reading the data DATA2 of the second word line WL2, and storing the read data DATA2 in the $1^{st}$ LAT. In such a case, the control logic 156 may control the control circuits 152, 154, and 155 to perform the output operation S4 of outputting the data DATA1 of the first word line WL1 stored in the $2^{nd}$ LAT to an exterior and the second storage operation S5 in an overlapping manner, after the discharge operation S2 or the moving operation S3 is completely performed. Furthermore, the control logic 156 may control the control circuits 152, 154, and 155 to perform only the output operation S4 in order to end the cache read operation in response to an external input of a third cache read command L4 (see FIG. 5).

When the second cache read command L2 or the third cache read command L4 is inputted in a section in which the first storage operation S1 for the first word line WL1 is performed or a section in which the discharge operation S2 for the first word line WL1 is performed in response to the external input of the first cache read command L1, the control logic 156 may control the control circuits 152, 154, and 155 to perform an execution section of the discharge operation S2 for the first word line WL1 and an execution section of the moving operation S3 for the first word line WL1 in such a way that the execution sections at least partially overlap each other.

Figure 4:
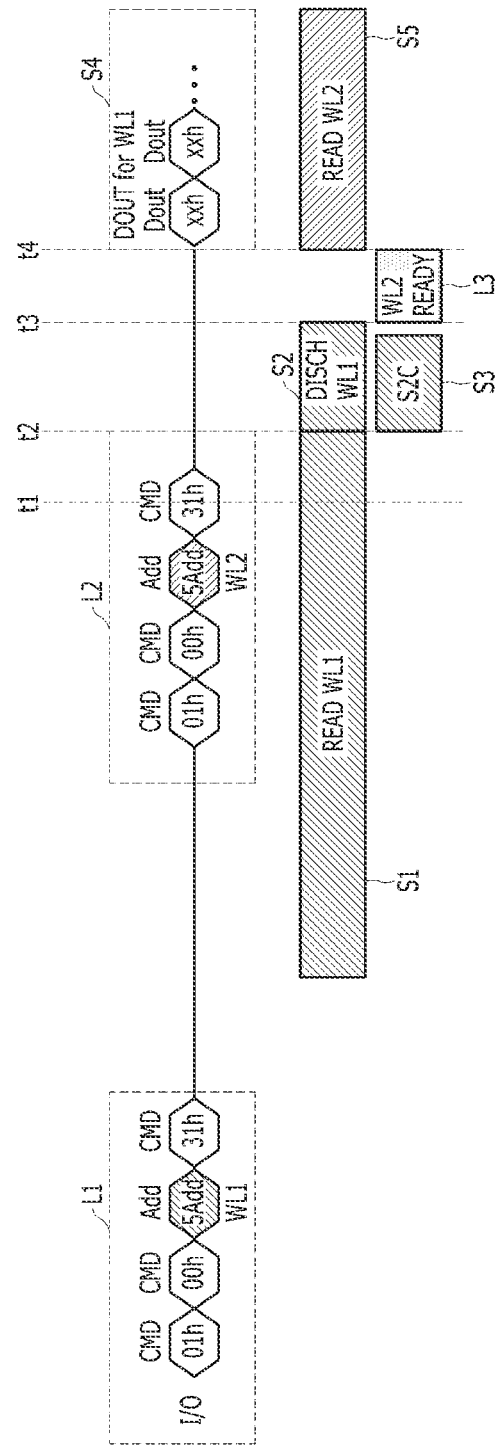
FIG. 4 to FIG. 7 are diagrams illustrating a cache read operation in accordance with an embodiment of the present disclosure.
Figure 5:
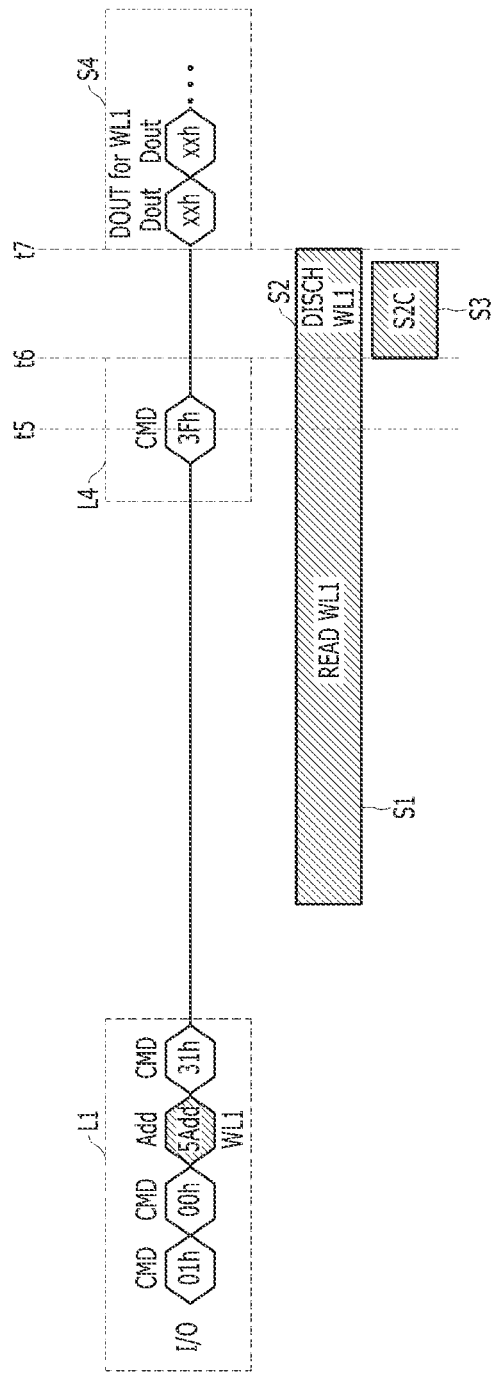

More specifically, referring to FIG. 4 and FIG. 5, when the second cache read command L2 or the third cache read command L4 is inputted in the section in which the first storage operation S1 for the first word line WL1 is performed in response to the external input of the first cache read command L1, the control logic 156 may control the control circuits 152, 154, and 155 to start the moving operation S3 for the first word line WL1 together at the start time of the discharge operation S2 for the first word line WL1.

As illustrated in FIG. 4, when the second cache read command L2 is inputted in the section in which the first storage operation S1 for the first word line WL1 is performed in response to the external input of the first cache read command L1, for example, when the second cache read command L2 is inputted at time t1 included in the section in which the first storage operation S1 is performed, the moving operation S3 for the first word line WL1 may be started at time t2 that is the start time of the discharge operation (DISCH) S2 for the first word line WL1. Accordingly, the execution section of the discharge operation S2 for the first word line WL1 and the execution section of the moving operation (S2C) S3 for the first word line WL1 may completely overlap each other. In accordance with an embodiment, as illustrated in the drawing, when the execution section of the moving operation S3 is shorter than that of the discharge operation S2, the execution section of the moving operation S3 may be hidden by the execution section of the discharge operation S2 and may not be visible. Of course, unlike the drawing, when the execution section of the moving operation S3 is longer than that of the discharge operation S2, the execution section of the discharge operation S2 may be hidden by the execution section of the moving operation S3 and may not be visible.

In this way, in response to the input of the second cache read command L2, the control logic 156 may control the control circuits 152, 154, and 155 to perform the execution section of the discharge operation S2 for the first word line WL1 and the execution section of the moving operation S3 for the first word line WL1 in such a way that the execution sections completely overlap each other. At this time, since the second cache read command L2 has been inputted at the time t1, the control logic 156 may control the control circuits 152, 154, and 155 to perform a preparation operation L3 for preparing the second storage operation S5 for the second word line WL2 after completely performing the discharge operation S2 and the moving operation S3 for the first word line WL1. That is, the control logic 156 may control the control circuits 152, 154, and 155 to perform the preparation operation L3 from time t3 when the discharge operation S2 and the moving operation S3 for the first word line WL1 have been completely performed to time t4. The preparation operation L3 may include an operation of selecting the second word line WL2 by decoding an address inputted together with the second cache read command L2, and an operation of resetting the $1^{st}$ LAT.

The control logic 156 may control the control circuits 152, 154, and 155 to start the second storage operation S5 for the second word line WL2 and the output operation S4 for the first word line WL1 together at the time t4 when the preparation operation L3 has been completely performed. That is, the second storage operation S5 for the second word line WL2 and the output operation S4 for the first word line WL1 may be performed in a completely overlapping manner.

As illustrated in FIG. 5, when the third cache read command L4 is inputted in the section in which the first storage operation S1 for the first word line WL1 is performed in response to the external input of the first cache read command L1, for example, when the third cache read command L4 is inputted at time t5 Included in the section in which the first storage operation S1 is performed, the moving operation S3 for the first word line WL1 may be started together at time t6 that is the start time of the discharge operation S2 for the first word line WL1. Accordingly, the execution section of the discharge operation S2 for the first word line WL1 and the execution section of the moving operation S3 for the first word line WL1 may completely overlap each other.

In this way, in response to the input of the third cache read command L4, the control logic 156 may control the control circuits 152, 154, and 155 to perform the execution section of the discharge operation S2 for the first word line WL1 and the execution section of the moving operation S3 for the first word line WL1 in such a way that the execution sections completely overlap each other. At this time, since the third cache read command L4 has been inputted at the time t5, the control logic 156 may control the control circuits 152, 154, and 155 to perform the output operation S4 for the first word line WL1 after completely performing the discharge operation S2 for the first word line WL1 and the moving operation S3 for the first word line WL1. That is, the control logic 156 may control the control circuits 152, 154, and 155 to start the output operation S4 for the first word line WL1 from time t7 when the discharge operation S2 and the moving operation S3 for the first word line WL1 are completely performed. For reference, it can be seen that the preparation operation L3 is not performed in FIG. 5, unlike FIG. 4. This is because the third cache read command L4 is a command for ending the cache read operation and there is no need to prepare a consecutive cache read operation any more.

Figure 6:
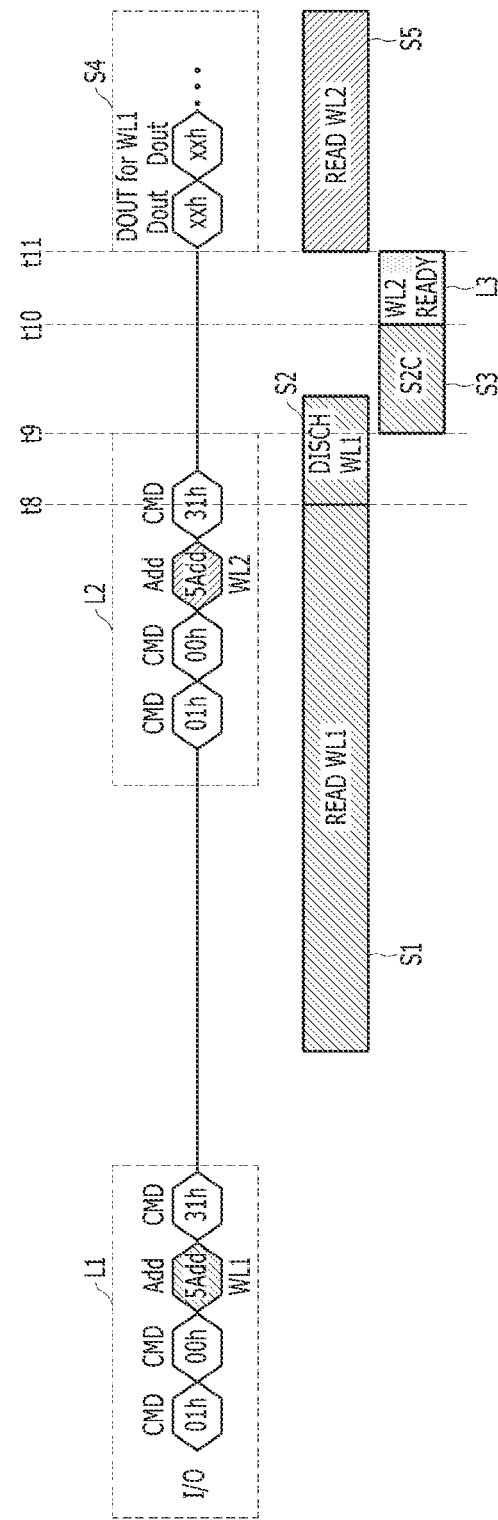
Figure 7:
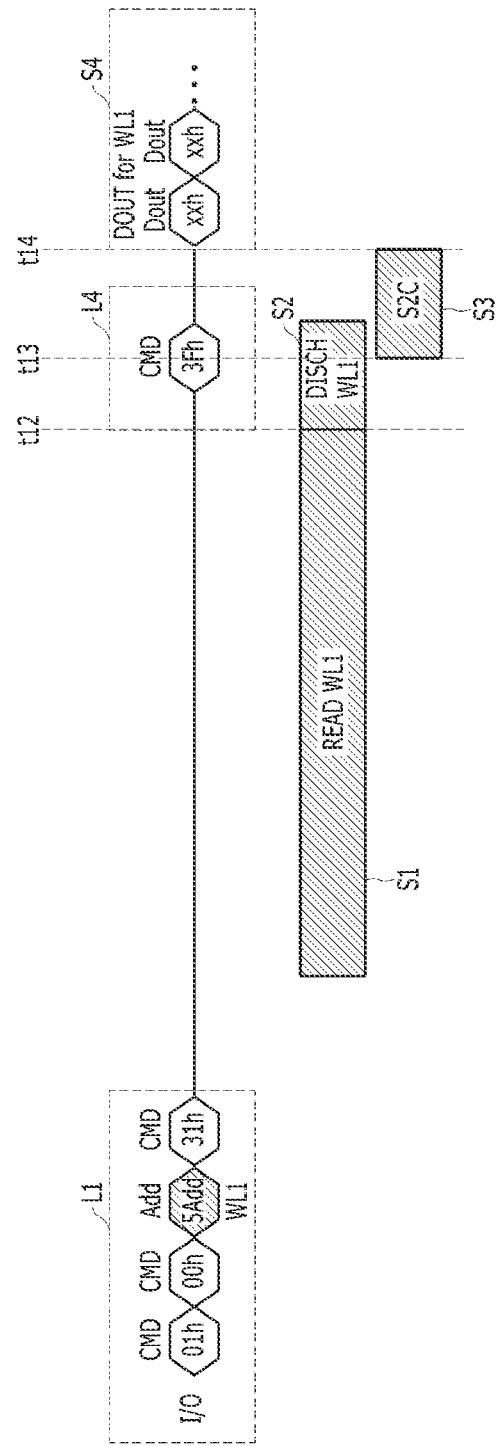

More specifically, referring to FIG. 6 and FIG. 7, after the completion of the section in which the first storage operation S1 for the first word line WL1 is performed in response to the external input of the first cache read command L1, when the second cache read command L2 or the third cache read command L4 is inputted in the section in which the discharge operation S2 for the first word line WL1 is performed, the control logic 156 may control the control circuits 152, 154, and 155 to start the moving operation S3 for the first word line WL1 at the time when it is confirmed that the second cache read command L2 or the third cache read command L4 has been inputted.

As illustrated in FIG. 6, after the completion of the section in which the first storage operation S1 for the first word line WL1 is performed in response to the external input of the first cache read command L1, when the second cache read command L2 is inputted in the section in which the discharge operation S2 for the first word line WL1 is performed, for example, when the second cache read command L2 is inputted at time t9 included in the section in which the discharge operation S2 is performed after time t8 when the first storage operation S1 has been completely performed, the moving operation S3 for the first word line WL1 may be started at the time t9 when it is confirmed that the second cache read command L2 has been inputted. Accordingly, the execution section of the discharge operation S2 for the first word line WL1 and the execution section of the moving operation S3 for the first word line WL1 may partially overlap each other.

In this way, in response to the input of the second cache read command L2, the control logic 156 may control the control circuits 152, 154, and 155 to perform the execution section of the discharge operation S2 for the first word line WL1 and the execution section of the moving operation S3 for the first word line WL1 in such a way that the execution sections partially overlap each other. At this time, since the second cache read command L2 has been inputted at the time t9, the control logic 156 may control the control circuits 152, 154, and 155 to perform the preparation operation L3 for preparing the second storage operation S5 for the second word line WL2 after completely performing the discharge operation S2 for the first word line WL1 and the moving operation S3 for the first word line WL1. That is, the control logic 156 may control the control circuits 152, 154, and 155 to perform the preparation operation L3 from time t10 when the discharge operation S2 and the moving operation S3 for the first word line WL1 have been completely performed to time t11. The preparation operation L3 may include an operation of selecting the second word line WL2 by decoding an address inputted together with the second cache read command L2, and an operation of resetting the $1^{st}$ LAT. The control logic 156 may control the control circuits 152, 154, and 155 to start the second storage operation S5 for the second word line WL2 and the output operation S4 for the first word line WL1 together at the time t11 when the preparation operation L3 has been completely performed. That is, the second storage operation S5 for the second word line WL2 and the output operation S4 for the first word line WL1 may be performed in a completely overlapping manner.

As illustrated in FIG. 7, after the completion of the section in which the first storage operation S1 for the first word line WL1 is performed in response to the external input of the first cache read command L1, when the second cache read command L2 is inputted in the section in which the discharge operation S2 for the first word line WL1 is performed, for example, when the third cache read command L4 is inputted at time t13 included in the section in which the discharge operation S2 is performed after time t12 when the first storage operation S1 has been completely performed, the moving operation S3 for the first word line WL1 may be started at the time t13 when it is confirmed that the third cache read command L4 has been inputted. Accordingly, the execution section of the discharge operation S2 for the first word line WL1 and the execution section of the moving operation S3 for the first word line WL1 may partially overlap each other.

In this way, in response to the input of the third cache read command L4, the control logic 156 may control the control circuits 152, 154, and 155 to perform the execution section of the discharge operation S2 for the first word line WL1 and the execution section of the moving operation S3 for the first word line WL1 in such a way that the execution sections partially overlap each other. At this time, since the third cache read command L4 has been inputted at the time t13, the control logic 156 may control the control circuits 152, 154, and 155 to perform the output operation S4 for the first word line WL1 after completely performing the discharge operation S2 for the first word line WL1 and the moving operation S3 for the first word line WL1. That is, the control logic 156 may control the control circuits 152, 154, and 155 to start the output operation S4 for the first word line WL1 at time t14 when the discharge operation S2 and the moving operation S3 for the first word line WL1 are completely performed. For reference, it can be seen that the preparation operation L3 is not performed in FIG. 7, unlike FIG. 6. This is because the third cache read command L4 is a command for ending the cache read operation and there is no need to prepare a consecutive cache read operation any more.

Figure 8:
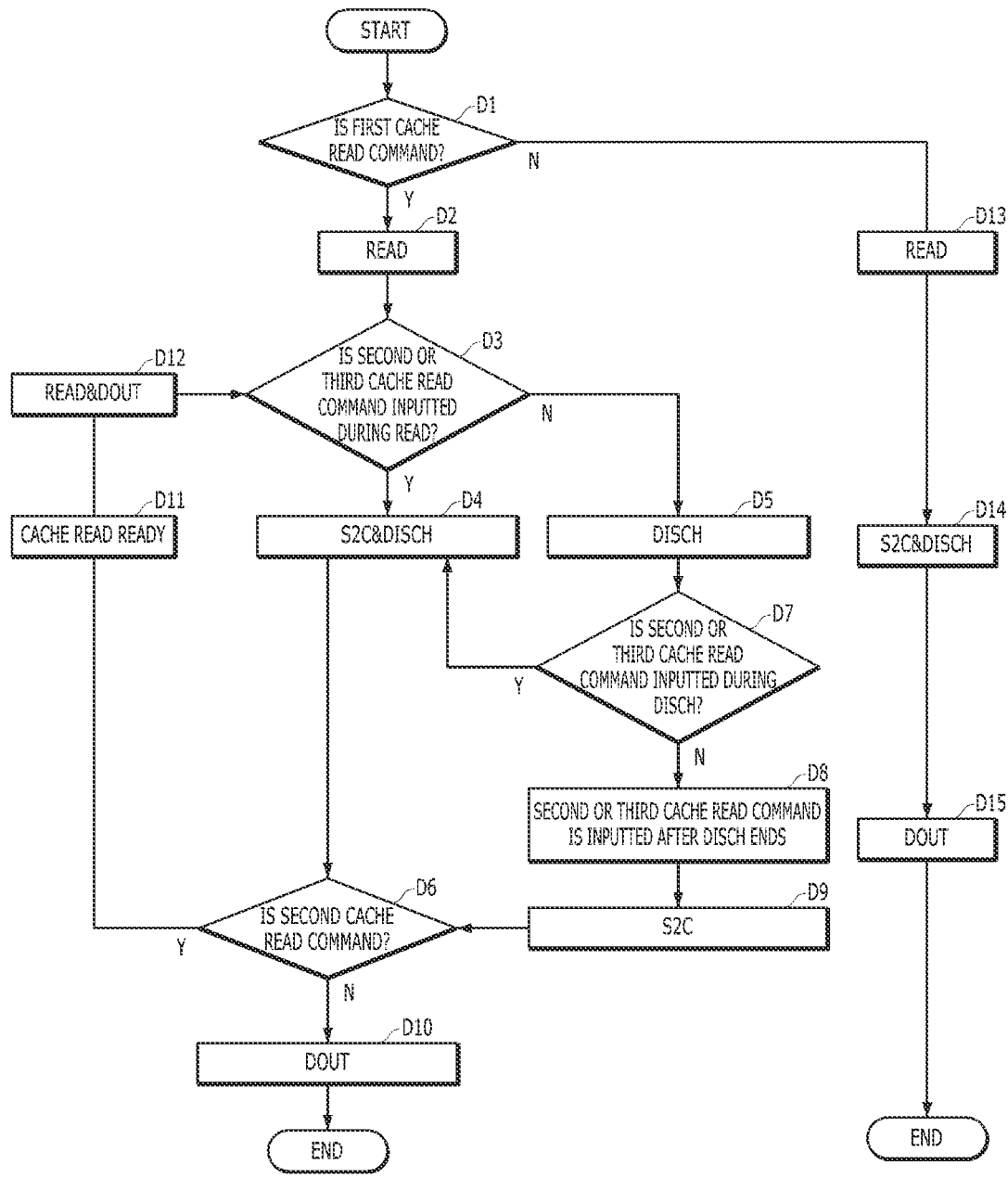
FIG. 8 is a flowchart illustrating a cache read operation in accordance with an embodiment of the present disclosure.

FIG. 8 is a flowchart illustrating the cache read operation in accordance with an embodiment of the present disclosure.

FIG. 8 illustrates an order in which the cache read operation is performed in the memory device 150 in accordance with an embodiment of the present disclosure.

Specifically, when a read command is inputted from the outside of the memory device 150, for example, the controller 130 (see FIG. 1), the memory device 150 may determine whether the inputted read command is the first cache read command (D1). That is, the memory device 150 may determine whether the read command inputted from the outside is the normal read command or the first cache read command.

When the determination result in the operation D1 indicates that the read command inputted from the outside is the normal read command (N of D1), the memory device 150 may read data from a memory cell coupled to a selected word line, corresponding to a normal address inputted together with the normal read command, among the plurality of word lines included therein and store the read data in the $1^{st}$ LAT of the page buffer 153 (D13).

After the data of the selected word line is stored in the $1^{st}$ LAT of the page buffer 153 through the operation D13, the memory device 150 may perform the discharge operation (DISCH) of discharging the selected word line and the moving operation (S2C) of moving the data of the $1^{st}$ LAT of the page buffer 153 to the $2^{nd}$ LAT together (D14).

The memory device 150 may output (DOUT) the data, stored in the $2^{nd}$ LAT of the page buffer 153 to an exterior, through the operation D14 (D15).

Since the operations D13 to D15 are normal read operations, no problem may occur even though the discharge operation and the moving operation are performed together in the operation D14. That is, in the case of the normal read operation, since there may not be a read operation to be performed before and after the normal read operation unlike the cache read operation, there may be no separate restriction on the condition for performing the moving operation of moving the data, stored in the $1^{st}$ LAT included in the page buffer 153, to the $2^{nd}$ LAT.

When the determination result in the operation D1 indicates that the read command inputted from the outside is the first cache read command (Y of D1), the memory device 150 may perform the first storage operation of reading (READ) data from the first word line corresponding to a cache address inputted together with the first cache read command among the plurality of word lines included therein and storing the read data in the $1^{st}$ LAT of the page buffer 153 (D2).

The memory device 150 may determine whether the second cache read command or the third cache read command is inputted during the operation D2 (D3).

When the determination result in the operation D3 indicates that the second cache read command or the third cache read command is inputted during the operation D2 (Y of D3), the memory device 150 may perform the discharge operation (DISCH) for the first word line and the moving operation (S2C) of moving the data, stored in the $1^{st}$ LAT of the page buffer 153, to the $2^{nd}$ LAT together (D4). Since the execution time of the operation D3 is a time before the discharge operation for the first word line is started, the memory device 150 may start the moving operation of moving the data, stored in the $1^{st}$ LAT of the page buffer 153, to the $2^{nd}$ LAT at a time when the discharge operation for the first word line is started. That is, when the second cache read command or the third cache read command is inputted during the operation D2, the memory device 150 may control the execution section of the discharge operation for the first word line and the execution section of the moving operation of moving the data, stored in the $1^{st}$ LAT of the page buffer 153, to the $2^{nd}$ LAT to completely overlap each other.

When the determination result in the operation D3 indicates that the second cache read command or the third cache read command is not inputted during the operation D2 (N of D3), the memory device 150 may discharge (DISCH) the first word line (D5).

The memory device 150 may determine whether the second cache read command or the third cache read command is inputted during the operation D5 (D7).

When the determination result in the operation D7 indicates that the second cache read command or the third cache read command is inputted during the operation D5 (Y of D7), the memory device 150 may perform the discharge operation for the first word line and the moving operation of moving the data, stored in the $1^{st}$ LAT of the page buffer 153, to the $2^{nd}$ LAT together (D4). Since the execution time of the operation D5 is a time after the discharge operation for the first word line is started, the memory device 150 may start the moving operation of moving the data, stored in the $1^{st}$ LAT of the page buffer 153, to the $2^{nd}$ LAT at a time when it is determined that the second cache read command or the third cache read command has been inputted. That is, when the second cache read command or the third cache read command is inputted during the operation D5, the memory device 150 may control the execution section of the discharge operation for the first word line and the execution section of the moving operation of moving the data, stored in the $1^{st}$ LAT of the page buffer 153, to the $2^{nd}$ LAT to partially overlap each other.

A case where the determination result in the operation D7 indicates that the second cache read command or the third cache read command is not inputted during the operation D5 (N of D7) may mean that the second cache read command or the third cache read command is inputted after the operation D5 is completely performed and the discharge operation for the first word line is completely performed (D8). In such a case, there may be a difference between the time when the operation D5 is completely performed and the time when the second cache read command or the third cache read command is inputted. That is, the memory device 150 may wait for the input of the second cache read command or the third cache read command after the operation D5 is completely performed.

When the second cache read command or the third cache read command is inputted during the operation D8, the memory device 150 may perform the moving operation (S2C) of moving the data stored in the $1^{st}$ LAT of the page buffer 153 to the $2^{nd}$ LAT (D9).

After performing the operation D9, the memory device 150 may determine which cache read command has been inputted during the operation D8 (D6). That is, the memory device 150 may determine whether the second cache read command has been inputted or the third cache read command has been inputted during the operation D8.

When the determination result in the operation D6 indicates that the third cache read command is inputted (N of D6), the memory device 150 may perform the output operation (DOUT) of outputting the data, stored in the $2^{nd}$ LAT of the page buffer 153, to an exterior (D10). This is because the third cache read command is a command for ending the cache read operation and there is no need to prepare a consecutive cache read operation any more after performing the output operation (D10) of outputting the data of the first word line, stored in the $2^{nd}$ LAT of the page buffer 153, to an exterior. Of course, when a read command is inputted during the operation D10, the memory device 150 may perform the operation D1 for the read command.

When the determination result in the operation D6 indicates that the second cache read command is inputted (Y of D6), the memory device 150 may perform the preparation operation (CACHE READ READY) of preparing a read from the second word line corresponding to a cache address inputted together with the second cache read command (D11). The preparation operation may include an operation of selecting the second word line by decoding the cache address inputted together with the second cache read command, and an operation of resetting the $1^{st}$ LAT included in the page buffer 153.

After completely performing the operation D11, the memory device 150 may perform the second storage operation of reading data (READ) from a memory cell coupled to the second word line, corresponding to the cache address inputted together with the second cache read command, among the plurality of word lines included therein and storing the read data in the $1^{st}$ LAT of the page buffer 153 and the output operation (DOUT) of outputting the data of the $2^{nd}$ LAT of the page buffer 153 to an exterior (D12). That is, after completely performing the operation D11, the memory device 150 may control the execution section of the second storage operation of reading the data from the second word line and storing the read data in the $1^{st}$ LAT of the page buffer 153 and the execution section of the output operation of outputting the data of the $2^{nd}$ LAT of the page buffer 153 to an exterior to completely overlap each other.

The memory device 150 may determine whether the second cache read command or the third cache read command is inputted during the operation D12 (D3). That is, since the operation D12 includes the second storage operation of reading the data from the second word line and storing the read data in the $1^{st}$ LAT of the page buffer 153, the memory device 150 may determine whether the second cache read command or the third cache read command is inputted, while performing the operation of reading the data of the second word line the operation D3.

If the determination result in the operation D3 indicates that the second cache read command is inputted during the operation D12 (Y of D3), a word line corresponding to the cache address inputted together with the second cache read command may be another word line different from the second word line, for example, the third word line.

In the above description one word line is coupled to one page, thus two different word lines are selected in response to two consecutive cache read commands. If one word line is coupled to two or more pages, two different pages included in one word line may also be selected in response to two consecutive cache read commands.

The present disclosure described above is not limited by the aforementioned embodiments and the accompanying drawings, and it is apparent to those skilled in the art to the present disclosure pertains that various substitutions, modifications, and changes can be made without departing from the technical spirit of the present disclosure and the following claims. Furthermore, the embodiments may be combined to form additional embodiments.

What is claimed is:

1. A memory device comprising:
    a memory cell array including a plurality of memory cells coupled between a plurality of word lines and a plurality of bit lines;
    a plurality of page buffers coupled to the plurality of bit lines, each page buffer including a first latch and a second latch;
    a control circuit configured to perform a storage operation of reading data of a page coupled to a word line selected from the plurality of word lines and storing the read data in the first latch, a discharge operation of discharging the selected word line after the storage operation, a moving operation of moving the data of the first latch to the second latch after the storage operation, and an output operation of outputting the data of the second latch to an exterior after the moving operation; and
    a control logic configured to control the control circuit such that an execution section of the discharge operation and an execution section of the moving operation for a first word line among the plurality of word lines at least partially overlap each other when a second or third cache read command is inputted in a section in which the storage operation or the discharge operation for the first word line is performed in response to input of a first cache read command for cache-reading data of a page coupled to the first word line.

2. The memory device of claim 1, wherein the second cache read command is a command for cache-reading data of a page coupled to a second word line among the plurality of word lines, and
    the third cache read command is a command for ending a cache read operation for the first word line after the cache read operation for the first word line is performed.

3. The memory device of claim 2, wherein, when the second or third cache read command is inputted in the section in which the storage operation for the first word line is performed, the control logic controls the control circuit to start the moving operation together at a start time of the discharge operation for the first word line.

4. The memory device of claim 3, wherein, when the second or third cache read command is inputted in the section in which the discharge operation for the first word line is performed, the control logic controls the control circuit to start the moving operation at a time when it is determined that the second or third cache read command has been inputted.

5. The memory device of claim 2, wherein, when the second cache read command is inputted in the section in which the storage operation or the discharge operation for the first word line is performed, the control logic controls the control circuit to start a preparation operation for preparing the storage operation for the second word line at a time when the discharge operation and the storage operation for the first word line are performed, and controls the control circuit to perform the storage operation and the output operation for the second word line together at a time when the preparation operation is performed.

6. The memory device of claim 5, wherein the control logic controls the control circuit to perform, as the preparation operation, an operation of selecting the second word line by decoding an address inputted together with the second cache read command and an operation of resetting the first latch.

7. The memory device of claim 5, wherein, when the third cache read command is inputted in the section in which the storage operation or the discharge operation for the first word line is performed, the control logic controls the control circuit to perform the output operation at a time when the discharge operation for the first word line and the moving operation for the first word line are performed.

8. A memory system comprising:
    a memory device including a memory cell array including a plurality of memory cells coupled between a plurality of word lines and a plurality of bit lines and a plurality of page buffers coupled to the plurality of bit lines, each page buffer including a first latch and a second latch; and
    a controller configured to generate a first cache read command for cache-reading data of a page coupled to a first word line among the plurality of word lines, to transfer the first cache read command to the memory device, to generate a second or third cache read command, and to transfer the second or third cache read command to the memory device,
    wherein, when the second or third cache read command is inputted in a section in which a first storage operation of reading data of the page coupled to the first word line in response to the first cache read command and storing the read data in the first latch or a discharge operation of discharging the first word line after the first storage operation is performed, the memory device performs the discharge operation and a moving operation of moving the data of the first latch to the second latch in an at least a partially overlapping manner.

9. The memory system of claim 8, wherein the controller generates the second cache read command and transfers the second cache read command to the memory device in order to cache-read data of a page coupled to a second word line among the plurality of word lines, and
    after a cache read operation for the first word line is performed, the controller generates the third cache read command and transfers the third cache read command to the memory device in order to end the cache read operation for the first word line.

10. The memory system of claim 9, wherein, when the second or third cache read command is inputted in a section in which the first storage operation is performed, the memory device starts the moving operation together at a start time of the discharge operation.

11. The memory system of claim 10, wherein, when the second or third cache read command is inputted in a section in which the discharge operation is performed, the memory device starts the moving operation at a time when it is determined that the second or third cache read command has been inputted.

12. The memory system of claim 9, wherein, when the second cache read command is inputted in a section in which the first storage operation or the discharge operation is performed, the memory device starts a preparation operation for preparing a second storage operation of reading the data of a page coupled to the second word line and storing the read data in the first latch at a time when the discharge operation and the moving operation are performed, and performs the second storage operation and an output operation of outputting data of the second latch to the controller at a time when the preparation operation is performed.

13. The memory system of claim 11, wherein the memory device performs, as the preparation operation, an operation of selecting the second word line by decoding an address inputted together with the second cache read command and an operation of resetting the first latch.

14. The memory system of claim 11, wherein, when the third cache read command is inputted in the section in which the first storage operation or the discharge operation is performed, the memory device performs the output operation at a time when the discharge operation and the moving operation are performed.

15. An operating method of a memory device including a memory cell array including a plurality of memory cells coupled between a plurality of word lines and a plurality of bit lines and a plurality of page buffers coupled to the plurality of bit lines, each page buffer including a first latch and a second latch, the operating method comprising:
a first storage operation of storing data of a page coupled to a first word line among the plurality of word lines in the first latch in response to input of a first cache read command;
a discharge operation of discharging the first word line after the first storage operation;
a moving operation of moving the data of the first latch to the second latch after the first storage operation; and
a parallel execution operation of performing an execution section of the discharge operation and an execution section of the moving operation in such a way that the execution sections partially overlap each other when a second or third cache read command is inputted in a section in which the first storage operation or the discharge operation is performed.

16. The operating method of claim 15, wherein the second cache read command is a command for cache-reading data of a page coupled to a second word line among the plurality of word lines, and
the third cache read command is a command for ending a cache read operation for the first word line after the cache read operation for the first word line is performed.

17. The operating method of claim 16, wherein the parallel execution operation comprises:
starting the moving operation together at a start time of the discharge operation when the second or third cache read command is inputted in the section in which the first storage operation is performed; and
when the second or third cache read command is inputted in the section in which the discharge operation is performed, starting the moving operation at a time when it is determined that the second or third cache read command has been inputted.

18. The operating method of claim 16, further comprising:
storing the data of the page coupled to the second word line in the first latch in response to input of the second cache read command;
outputting data of the second latch to an exterior after the moving operation; and
when the second cache read command is inputted in the parallel execution operation, starting a preparation operation for preparing the second storage operation at a time when the parallel execution operation is performed and performing the second storage operation and the output operation together at a time when the preparation operation is performed.

19. The operating method of claim 17, wherein the preparation operation includes an operation of selecting the second word line by decoding an address inputted together with the second cache read command and an operation of resetting the first latch.

20. The operating method of claim 17, further comprising:
when the third cache read command is inputted in the parallel execution operation, performing the output operation at a time when the parallel execution operation is performed.

* * * * *